United States Patent Office 3,039,935
Patented June 19, 1962

3,039,935
PRODUCTION OF CRYSTALLINE GLUCOSE
Delmar F. Rentshler, David P. Langlois, Roy F. Larson, and Laurence H. Alverson, Decatur, Ill., and Robert Winston Liggett, Birmingham, Ala.
No Drawing. Filed Feb. 25, 1960, Ser. No. 10,846
8 Claims. (Cl. 195—11)

This invention relates to improvements in the manufacture of crystalline glucose. More particularly, it relates to the production of crystalline glucose by hydrolysis of starch and/or starch conversion products wherein the major proportion of the hydrolysis is accomplished with amyloglucosidase.

This application is a continuation-in-part of applications S.N. 644,978 and S.N. 644,979 both filed March 11, 1957, and both now abandoned.

Current manufacture of crystalline glucose is based predominantly on the acid catalyzed hydrolysis of starch, hydrochloric acid being the preferred catalyst. In this manufacturing process, economic and technical requirements result in the production of a large proportion of by-product final mother liquor of little value. Typical yields from 100 parts of starch dry substance are 80 parts of glucose dry substance (88 parts of crystalline glucose hydrate) and 30 parts of mother liquor dry substance. Typical final mother liquor is a bitter and salty, dark-colored substance, containing 72.5% dry substance, of which dry substance 55% is glucose, 33% is higher sugars, and 12% is ash, chiefly sodium chloride.

Crystalline glucose is manufactured chiefly as the monohydrate but some anhydrous material is also produced. Both forms consist of discrete crystals or crystal clusters, rather than particles of a dried, crushed, and screened crystal mass. Both are manufactured to high standards of purity, color, and flavor. As used herein, the expression "crystalline glucose" refers to the monohydrate.

Three synonymous expressions are used in the specification and claims for the percent by weight of anhydrous glucose ($C_6H_{12}O_6$) in a composition on a dry substance basis. They are "percent glucose," "glucose content," and "D." The composition may be a solution or sirup, or it may be a dry solid. The conventional abbreviation D.E. is also used herein. It refers to the copper reducing value of a composition on a dry substance basis calculated as anhydrous glucose. Wherever it is intended to refer to the weight proportion of anhydrous glucose in a solution or sirup, on a liquid or "as is" basis, the unqualified expression "percent glucose by weight" is used.

In addition to the production of much low-value mother liquor, other disadvantages of the acid conversion process are: (1) the formation of substantial proportions of reversion products during the hydrolysis, chiefly glucose repolymerization products; (2) high-proportion seeding required in the glucose crystallizer; (3) need for careful temperature control during the crystallization; (4) the tieing up of large amounts of equipment and product during the long crystallization; and (5) special procedures for recycling and reconverting the mother liquor to obtain higher yields of glucose.

Efforts have been made to increase the glucose yield and thus reduce the amount of final mother liquor, or hydrol, as it is called. Chief among these is the use of ion exchange resins to remove salts and other ionic impurities from the process liquors. This greatly reduces the proportion of final mother liquor, but the increased glucose yield is less than expected. Operation of the large beds of ion exchange resins leads to substantial losses of glucose in the wash and regeneration effluents.

It is known that glucose can be crystallized from refined and concentrated sirups obtained by enzyme hydrolysis of starch and its intermediate conversion products. Examples of this prior art are found in United States Patents 2,531,999; 2,567,000 and 2,717,582. However, none of the foregoing prior art methods are commercially competitive with the conventional acid hydrolysis method from the sandpoint of production cost. The glucose yield per unit weight of starch is low and the enzyme cost per unit weight of crystalline glucose is high.

We have discovered several improvements in the enzyme production of crystalline glucose from starch and its conversion products which collectively provide a method having the following important advantages over the conventional and hydrolysis method:

(1) The starch, or starch conversion product, is hydrolyzed to glucose to a greater extent.

(2) The glucose crystallizes more rapidly from its refined and concentrated sirups, and it has a better flavor because it is crystallized from a more palatable mother liquor.

(3) The mother liquor is a more valuable by-product because it is an edible and palatable sirup easily refined to high standards of color and flavor.

(4) Production cost of the crystalline glucose is less because of the increased rate of glucose crystallization and increased value of the mother liquor.

The improvements in our process responsible for the advantages above are as follows:

(1) The starch is pasted with water and the paste is partially converted with acid or with alpha amylase to a D.E. lying within the range of about 10–20.

(2) Amyloglucosidase is used to complete the conversion of starchy raw material to glucose, i.e., to raise the D. in the conversion liquor to a value not less than about 83.

(3) The concentrations of glucose and dry substance in the glucose crystallizer feed liquor are controlled within narrow limits.

(4) The degree of glucose supersaturation in the crystallization step is controlled to values lying within the range of 1.02–1.20.

Preliminary partial conversion (and thinning) of the pasted starch is necessary to obtain a concentrated starch substrate which can be efficiently hydrolyzed to glucose with the amyloglucosidase. Satisfactory catalysts for the thinning are those selected from the group consisting of mineral acids and alpha amylase. A solution or paste of the swollen or gelatinized starch granules is necessary because the ungelatinized granules are at best only slowly attacked by the amyloglucosidase, and a concentrated substrate is required to minimize evaporation costs. Conventional dilute pastes of unmodified starches are efficiently hydrolyzed to glucose with the enzyme, but the paste viscosity of unmodified starches increases so rapidly with increasing solids that the practical upper limit of paste solids is about 20% by weight. And in addition to the objectionable viscosity at the higher solids, the thick pastes are incompletely hydrolyzed with amyloglucosidase. They leave a residue of gelatinous starchy material quite resistant to enzyme attack and difficult to separate from the liquid hydrolyzate. Thus, when dilute conventional pastes of unmodified starches are used to obtain a free-filtering hydrolyzate and a high conversion of starch to glucose, much water must be removed from the hydrolyzate before it is suitably concentrated for crystallization. More concentrated pastes at workable viscosities are available from the hypochlorite oxidized starches, but their conversion to glucose with amyloglucosidase is poor, both rate and extent of hydrolysis being too low to be commercially useful. Fluid concentrated pastes of unmodified starches containing as high as 35–40% starch solids by weight can be made by high temperature cooking in the range of 250–300° F., but again, such pastes are inefficiently converted by the enzyme. The production of a gelatinous enzyme-resistant starchy material, noted above in connection with the more concentrated conventional pastes of unmodified starches, is aggravated. As much as 15–20% of the original starch dry substance remains in this form. In addition to reducing the glucose yield, the gelatinous residue seriously interferes with refining the hydrolyzate in preparation for crystallization.

We have found, as a general rule, that the percent glucose in the liquor phase of the enzyme hydrolyzate, after a standard treatment with amyloglucosidase, increases as the D.E. of the low D.E. conversion liquor decreases. On the other hand two objectionable process features appear at this stage to an increasing degree as the D.E. declines. They are (1) increasing substrate viscosity and (2) an increasing amount of residual gelatinous starchy material. Below a D.E. of 10, the percent glucose in the liquid portion of the final hydrolyzate is suitably high and quickly attained, but the substrate viscosity and the proportion of residual gelatinous starchy material are both troublesome. Above a substrate D.E. of 20, the substrate viscosity is satisfactorily low and substantially no gelatinous material remains in the final hydrolyzate, but the percent glucose in the hydrolyzate is less than the desired 83. A minimum of 83% glucose in the final hydrolyzate is desired because below this concentration the rate of crystallization is unsatisfactorily slow.

Use of amyloglucosidase to convert or hydrolyze the starch-derived substrate to glucose is an important feature of our process. This enzyme is characterized by its ability to hydrolyze starch and its partial conversion products to glucose without the attending production of significant amounts of low molecular weight products such as maltose. The enzyme appears to remove glucose units one at a time from the end of a chain of anhydroglucose units in the starch molecule. It also hydrolyzes maltose and higher polysaccharides present in starch hydrolyzates, apparently in much the same manner as it operates on a starch chain.

The preparation of amyloglucosidase, in the form of mold culture broths, is described in United States Patents No. 2,557,078, No. 2,881,115 and No. 2,893,921. Purification of a crude preparation, the water extract of the mold, *Rhizopus delemar*, is described at page 3359–3365, volume 73 of the Journal of the American Chemical Society.

When the enzyme we designate as amyloglucosidase was first recognized as a separate hydrolytic agent (cf. Journal Bio. Chem., volume 161, page 219) in cultures of *Aspergillus oryzae*, it was regarded as an alphaglucosidase such as maltase. Later (cf. Cereal Chemistry, volume 25, page 191) it was referred to as a "maltase" enzyme with "glucogenic activity" capable of hydrolyzing higher glucose polymers such as dextrins and starch. Still later (cf. J.A.C.S. 73, 3359) it was named gluc-amylase. Another name applied to the enzyme is starch glucogenase.

The purity and potency of a particular crude amyloglucosidase preparation depend upon several factors, among which are (1) the microorganism, (2) the nutrients supplied to the culture medium, and (3) the culturing process conditions such as time, temperature, and pH. The utility of an amyloglucosidase preparation in our invention is not restricted to preparations of high purity, or to those which have been refined by known procedures, e.g., fractionation with salts or with alcohol. Obviously, however, the commercial usefulness of a preparation such as, for example, the filtered culture medium of a selected mold will increase with the potency or enzyme strength of the filtrate and decrease with increasing concentration of colored materials. We have found that excellent amyloglucosidase preparations, in the form of filtered culture broths, can be obtained from selected strains of *Aspergillus niger* according to the teaching of United States Patent 2,557,078 and from selected strains of *Aspergillus phoenicis* according to United States Patents 2,881,115 and 2,893,921. The selected strains of *Aspergillus phoenicis* disclosed in the latter two patents are *Aspergillus phoenicis* ATCC 13,156 and *Aspergillus phoenicis* ATCC 13,157.

It has long been known that starch can be hydrolyzed to glucose with a mixture of alpha amylase and maltase or by alpha amylase followed with maltase, and that crystalline glucose can be crystallized from the concentrated hydrolyzates. This knowledge did not lead to a commercially feasible crystalline glucose process, despite the ready availability and low cost of alpha amylase, because maltase was, and still is, comparatively expensive to produce. Not until amyloglucosidase, initially confused with the maltases of yeast and pancreas, became readily available from the culturing of selected molds, was there a sound economic basis for making crystalline glucose by enzyme hydrolysis of starch.

A third important element in our invention is careful control of the D. and dry substance in the refined and concentrated hydrolyzate sent to the crystallization step. The following table shows the desired control when the crystallization is begun at 40° C.

TABLE 1

| D. | Percent Dry Substance by Weight |
| --- | --- |
| 82.0–85.9 | 76 |
| 86.0–89.9 | 75 |
| 90.0–92.9 | 74 |
| 93.0–94.9 | 73 |
| 95.0–95.9 | 72 |

For other starting crystallization temperatures within the range of 20–54° C., the dry substance values in the above table are determined by the following Equation 1:

$$S_t = S_{40} + 0.8(t-40)$$

where $t$ = temperature in degrees centigrade
$S_{40}$ = percent dry substance according to Table 1 for a given range of D.
$S_t$ = percent dry substance in crystallizer feed at a beginning crystallization temperature within the range of 20–54° C.

Regulation of crystallizer feed dry substance by D. values according to Table 1 and Equation 1 is necessary to avoid undesirable shock seeding when the dry substance content is high, and low rate and yield of crystallization when the dry substance content is low. The close control indicated by the table, which is a closer control of the two variables than is needed in the conventional acid conversion process, is due to the higher purity of the enzyme hydrolyzate. In practice, the refined hydrolyzate is evaporated to a slightly higher dry substance content than required by the D. value according to Table 1, then it is diluted with unevaporated hydrolyzate or water until the desired dry substance value is reached. This is necessary because large evaporators are difficult to operate within such close limits. The evaporation can be accomplished without shock seeding by keeping the evaporator charge at a suitably elevated temperature.

A fourth novel and important feature of our invention is control of supersaturation during the crystallization step to a value lying within the range of about 1.02 to 1.20. As used herein, the term "supersaturation" is defined as the ratio of observed concentration of glucose (neglecting non-glucose solids present) to the known equilibrium concentration of glucose in water at the same temperature. For example, a refined and concentrated enzyme hydrolyzate has a dry substance content of 75% with 90% of the dry substance being glucose. The sirup thus has a glucose content of 67.5% (75×0.90), and 67.5 parts by weight of glucose are associated with 25 parts by weight of water. The concentration of glucose in the imaginary binary solution of glucose and water is therefore $$100\frac{(67.5)}{67.5+25} \text{ or } 73\%$$

At 40° C., the equilibrium solubility of glucose in water is 62% (see Industrial and Engineering Chemistry, volume 28, page 260). Hence, at 40° C., the sirup in the example would have a supersaturation of 73/62 or 1.18.

It is convenient to exercise the required control of supersaturation by controlling the massecuite temperature because glucose has a substantial temperature coefficient of solubility in water. Other means for controlling the supersaturation are known and can be used if desired. For example, supersaturation can be increased by removing water from the sirup, as by evaporation, and supersaturation can be decreased by adding water or dilute sirup.

We have found that the glucose supersaturation in our process must be controlled within a much narrower range than is necessary in the conventional acid conversion process. It seems likely that the following two facts are responsible for this difference. The purity, i.e., the glucose content and D.E., of the enzyme hydrolyzate exceeds that of the corresponding acid hydrolyzate, and the characters or compositions of the two sets of impurities are different. In view of the milder hydrolysis conditions of the enzyme method, i.e., lower temperature and more neutral pH, the impurities in the enzyme hydrolyzate are less than and unlike those in the acid hydrolyzate.

We have also discovered that substantially complete transformation of starch into crystalline glucose can be accomplished by a commercially feasible modification of the foregoing described process. The modification comprises three principal features: (1) recycling the glucose mother liquor to the amyloglucosidase hydrolysis step where it is mixed with fresh low D.E. starch conversion liquor and more amyloglucosidase, (2) contacting the process liquors with ion exchange resins to prevent excessive accumulation of inorganic salts (ash) in the glucose crystallizer feed sirup, and (3) contacting the process liquors with color adsorbents to prevent excessive accumulation of colored impurities in the glucose crystallizer feed sirup.

Considerable latitude, process-wise, is permissible in the execution of the foregoing features. For example, the mother liquor may be mixed with fresh starch before the latter is pasted and thinned, or it may be added to the low D.E. liquor at the beginning of the amyloglucosidase hydrolysis step. The latter alternative is preferred. The ash content of the feed liquor to the crystallizer may be held to the desired low level either by treating the mother liquor separately with ion exchange resins or by treating the mixture of mother liquor and fresh starch hydrolyzate with the resins. Preferably the latter alternative is carried out on the mixture after the amyloglucosidase hydrolysis and before the concentration required for crystallization. The necessary color refining of the process liquors is preferably accomplished by contacting the amyloglucosidase-hydrolyzed mixture of mother liquor and fresh starch hydrolyzate, in the dilute stage, with suitable color absorbents. A fair degree of color control can be obtained by treating the mother liquor alone with color absorbents, but the efficiency of the color absorbents is less by this procedure than by the preferred one.

The value of a commercially feasible method for obtaining a substantially complete transformation of starch into crystalline glucose is potentially great. The current production of about 800,000,000 pounds of crystalline glucose in this country is accompanied by the production of about 150,000,000 pounds of relatively low value mother liquor or hydrol. Rarely, if ever, can the highly colored and bitter by-product be disposed of at a price which yields a return as high as the calculated starch value of the starch-equivalent solids in the mother liquor. Elimination of this by-product, whose disposition becomes an acute problem at times, and its replacement by additional main product obviously would be quite valuable to the manufacture of crystalline glucose.

In our process, the proportion of amyloglucosidase based on raw material is not critical. High proportions shorten the conversion time, but increase the enzyme and refining costs of the process. We prefer to use enough enzyme to finish the conversion in about 48 hours. Enzyme assay and calculation of amount required to hydrolyze a given quantity of starch to glucose are explained in United States Patent 2,893,921.

As mentioned earlier, unmodified starch is the preferred raw material in the manufacture of crystalline glucose by our process. Corn starch is commonly used because of its abundance and low cost. Other starches, such as those derived from milo (or sorghum), wheat, potatoes, rice, and tapioca may also be used. Acid modified starches and slightly converted dextrins are suitable. Since starch is a polymer of anhydro-glucose, many of its intermediate hydrolytic products can be further hydrolyzed to glucose in accordance with our invention.

Low concentrations of raw material diminish the rate of enzyme hydrolysis and increase evaporation costs. High concentrations promote undesirable synthesis reactions, i.e., repolymerization of glucose and thus decrease the equilibrium conversion of starch to glucose. The range of 25 to 35% starch concentration is optimum.

Maximum efficiency of amylglucosidase is obtained in the temperature range of 55° to 65° C. and in the pH range of 4 to 5. Useful results can be obtained with the enzyme outside these ranges, such as 50° to 70° C. and 3 to 6 pH, but at greater expense.

It is our experience that when the conversion liquors are refined enough to yield crystalline glucose of the desired color standard, and to prevent objectionable build-up of impurities, substantially no enzyme activity remains in the refined liquor. Thus we found it impractical to attempt to reuse the enzyme. That objective is incompatible with the refining requirements of our process. Suitable color refining agents are natural bone char, synthetic bone char (Synthad, manufactured by Baugh and Sons, Philadelphia, Pennsylvania), activated vegetable carbons, and ion exchange resins. The only commercially feasible ash removing agents are the ion exchange resins. Thus the resins can be used for both kinds of refining, color and ash. Generally, however, a combination of ion exchange resins and carbonaceous color refining agent is cheaper because the latter is the less expensive color refiner.

Satisfactory cation exchange resins are the polymeric sulfonic acid type. These may be prepared by sulfonating a suitable polymeric material such as a copolymer of styrene and divinylbenzene or by condensing an aldehyde, such as formaldehyde, with a phenol, such as resorcinol, and a sulfonic acid, such as benzaldehyde 2–4 disulfonic acid. Cation exchange resins of the polymeric sulfonic acid type are marketed by Chemical Process Company, Redwood City, California, under the trade name Duolite C–3 and Duolite C–10, and by Rohm and Haas Company, Philadelphia, Pennsylvania, under the trade name IR–120.

Satisfactory anion exchange resins are the polymeric amine type. These may be made by condensing an aromatic amine with formaldehyde, or by reacting a polyamine such as m-phenylene diamine, and a phenol with formaldehyde. Another method is to nitrate a suitable polymeric material such as styrene-divinylbenzene copolymer, and reduce the nitration product. Anion exchange resins of the polymeric amine type are marketed by Chemical Process Company, Redwood City, California under the trade names Duolite A–2, Duolite A–4, and Duolite A–6, and by Rohm and Haas Company, Philadelphia, Pennsylvania under the trade name IR–4B and IR–45.

In our cyclic process we prefer to return mother liquor to the enzyme conversion step where it is mixed with fresh thinned starch paste. During the amyloglucosidase conversion step, some of the mother liquor nonglucose carbohydrate and most of the added starch is hydrolyzed to glucose. The D.E. and D. of this hydrolyzate will not be as high as would be obtained from the starch alone, but it will be higher than would be obtained by enzyme converting the starch alone and then adding the mother liquor. By repeatedly returning mother liquors to successive runs the D.E. and D. of the syrup going to the evaporators and crystallizer are lowered to equilibrium values of about 90.5 and 86.5, respectively, instead of about 96.0 and 93.0, respectively, obtained from starch alone. At this point enough mother liquor non-glucose carbohydrate is hydrolyzed to glucose each cycle to maintain the non-glucose carbohydrate fraction in the hydrolyzate constant at about 13.5% (d.s.b.). Also, an amount of glucose equivalent to fresh starch added is removed each cycle, mostly as crystalline product and partly as soluble loss on the ion exchange resins and color refining agent.

Our improved cyclic process can be repeated indefinitely provided salts are not allowed to accumulate in the feed syrup to the glucose crystallization step beyond an ash content exceeding 3% of the syrup solids. Soluble non-carbohydrate organic impurities coming from the starch, the enzyme preparation, and the refining agents do not build up to interfering levels in our process. Most of them are removed with the color refining agent, such as activated carbon, and the remainder go out in the salt removal step. The organic impurities are kept within desired limits by saccharifying well-washed commercial starches such as those derived from corn, wheat, rice and potatoes, or anhydro-dextrose polymers derived from these starches, with high-activity, low-impurity enzyme preparations.

The following examples illustrate our invention.

*Example 1*

Sixteen kilograms of unmodified corn starch (88% dry substance) was slurried with 24 liters of tap water mixed with 57 mls. of 37% hydrochloric acid. The slurry was stirred mechanically and heated with injected steam in a jacketed autoclave at 120° C. until the D.E. of the liquor was about 10. Heating time at 120° C. was about nine minutes. The autoclave was vented to relieve the steam presure and the hot liquor was neutralized in the autoclave to 4 pH with saturated aqueous soda ash solution. The 4 pH liquor was cooled to 63° C. with cooling water in the autoclave jacket. At this point, the viscous liquor contained about 32% dry substance. Concentrated broth from the submerged culturing of a strain of *Aspergillus phoenicis* (ATCC 13,157) according to United States Patent 2,881,115 containing a total of 140,000 units of amyloglucosidase and adjusted to 4 pH was stirred into the 10 D.E. starch hydrolyzate. A unit of amyloglucosidase is defined in United States Patent 2,881,115. Enzyme hydrolysis was allowed to proceed for 48 hours at 60–63° C. The hydrolyzate was mixed with 150 grams of filter aid, filtered to remove a small amount of residual insoluble matter, then stirred with 150 grams of activated vegetable carbon and filtered again. Both filter cakes were washed with water and the washings were added to the filtrate. The decolorized liquor (95 D.E. and 92.8% glucose on a dry substance basis) was then vacuum evaporated to 74% dry substance at a maximum temperature of 60° C. The liquor (20 kg.) was cooled to 43° C. and placed in a glucose crystallizer containing about 5 kg. of massecuite at 30° C. from a previous first crystallation. Temperature of the diluted massecuite was about 40° C. The crystallizer was equipped with a slow moving double spiral agitator, a jacket for circulation of temperature controlling fluid, and means for controlling the massecuite temperature according to a pre-set time schedule. The temperature controller was set to hold the massecuite temperature at 40° for eight hours, drop the temperature gradually to 30° C. over a 16 hour period, then hold the temperature at 40° C. for 24 hours. This pattern of temperature control, in combination with the particular crystallizer (including agitator speed) and proportion of massecuite seeding, maintained the glucose supersaturation within the range of about 1.1 to 1.6 during the first 24 hours of crystallization. Thereafter the supersaturation declined to a final value of about 1.02. Four-fifths of the massecuite (20 kg.) was filtered in a centrifuge and the cake of glucose crystals was washed in the centrifuge with a fine spray of water at about 30° C. Total wash water amounted to 1400 grams. The cake of washed crystals containing about 7% free moisture was removed from the centrifuge, spread out in a thin layer on a tray and dried in a current of warm air. Yield of colorless crystalline glucose was 9.7 kg. The combined mother liquor and washings (83 D.E. and 76% glucose on a dry substance basis) was vacuum evaporated to 78% solids. The sirup, amounting to 7.8 kg., was placed in a second crystallizer similar to the one described above containing about 2 kg. of massecuite from a previous second crystallization and subjected to the following crystallization schedule of time and temperature: hold at 40° C. for 24 hours, dropped gradually from 40° C. to 30° C. over a period of 48 hours, and then held at 30° C. for 48 hours. This schedule, with the particular crystallizer and seeding technique, controlled the glucose supersaturation during the first three days to values lying within the range of 1.15 to 1.20, and during the last two days permitted the supersaturation to drop to about 1.03, the practical limit to liquor exhaustion. From 7.8 kg. of the massecuite there was recovered 3350 grams of a second crop of washed and dried glucose having substantially the same color and quality as the first crop. Wash water (30° C.) amounted to 500 grams. The combined second mother liquor and washings is a palatable sirup easily refined by known methods to remove color and ash content to yield a substantially colorless high quality edible sirup. The combined second mother liquor and washings weighed 4.95 kg. It contained 62% by weight of dry substance, 31.6% by weight of glucose, and its D.E. was 65. The total yield of glucose from the two crystallizations was 13.05 kg. This is 76% of the theoretical maximum, assuming 100% hydrolysis of the starch to glucose, or 82% of the glucose actually liberated by the combined acid and enzyme hydroylsis.

*Example 2*

Example 1 was repeated except for increasing the D.E. of the preliminary acid converted sirup from 10 to 20. The higher D.E. sirup was less viscous and easier to handle prior to the enzyme conversion, but the final D.E. and glucose content of the enzyme hydrolyzate were lower being 93 and 90% respectively. The yield of high quality crystalline glucose was reduced to 12.4 kg. or 80% of the glucose liberated by the combined acid and enzyme hydrolysis.

*Example 3*

Example 1 was repeated except for (1) increasing the D.E. of the preliminary acid converted sirup from 10 to 15 and (2) starting the crystallization at 45° C. instead of 40° C. The final D.E. and glucose content of the enzyme hydrolyzate were 94 and 91.5% respectively. The clarified and decolorized hydrolyzate was evaporated to 78% solids according to Equation (1). The yield of high quality crystalline glucose was increased from 13.05 kg. to 13.3 kg., and the weight of final mother liquor, including second crystal crop washings, was reduced from 4.95 kg. to 4.0 kg.

*Example 4*

Example 3 was repeated except that the beginning crystallization temperature was reduced from 45° C. to 35° C. and the dry substance content of the sirup to the crystallizer was reduced from 78% to 70%. Yield of crystalline glucose was reduced from 13.3 to 12.7 kg., and the quantity of final mother liquor, including second crystal crop washings, was increased from 4.0 to about 6.0 kg.

*Example 5*

Sixteen kg. of commercial unmodified corn starch (12.5% moisture, 14 kg. dry substance) and 42 grams of a commercial alpha amylase preparation (Takamine B.S. Concentrate) were slurried with 30 liters of cool water at 6 pH. The slurry was heated gradually with stirring in a steam bath to 78° C., at which temperature the starch was pasted and rapidly thinned with the enzyme. After being held for about 15 minutes at 70° C., the paste was heated rapidly to 95° C. to inactivate the alpha amylase. The hot paste was cooled to 60° C. and adjusted to 4.5 pH with a small amount of hydrochloric acid. At this stage, the D.E. and dry substance content of the paste were 17.5 and 30.2% respectively. The enzyme thinned starch paste or sirup was then further hydrolyzed with amyloglucosidase and processed to recover crystalline glucose as described in Example 1.

*Example 6*

This example illustrates the application of our invention to a cyclic process in which the mother liquor is returned to the amyloglucosidase conversion step of the process where it is mixed with fresh low D.E. acid converted starch sirup and more enzyme. Substantially all of the starch is recovered as its equivalent amount of crystalline glucose and substantially no mother liquor has to be discarded, provided the ash content of the liquor sent to the glucose crystallizer is kept below about 3% by weight of the liquor solids. This is conveniently accomplished in known manner with ion exchange resins.

A slurry of 2273 g. of commercial unmodified corn starch (12% moisture, 2000 g. dry substance), 6820 ml. of water and 10.2 mls. of 37% hydrochloric acid was pasted and cooked in an autoclave at 35 p.s.i. gage steam pressure to obtain a 15 D.E. thinned starch paste. About five minutes cooking was required. The paste was cooled to about 60° C. and neutralized to 4.5 pH with soda ash. Mother liquor from a previous run (1137 g. dry substance) and 31,400 units of amyloglucosidase were mixed with the cooled and neutralized paste. The amyloglucosidase was in the form of a concentrated broth from the culturing of *Aspergillus phoenicis* ATCC 13,156. The mixture was then incubated at 55–60° C. for 48 hours, at the end of which time saccharification was practically finished, yielding an 89 D.E. syrup whose dry substance was 83% glucose. The syrup was filtered, passed first over Duolite C–3 cation exchange resin in the hydrogen form and then over Duolite A–6 anion exchange resin in the free base form to reduce the salt content. Duolite C–3 and Duolite A–6 ion exchange resins are manufactured by Chemical Process Company, Redwood City, California. The demineralized liquor was decolorized with 36 g. of activated carbon at about 75° C. and filtered again. The clear filtrate was vacuum evaporated to 76% solids and transferred to a crystallizer. The concentrated syrup was seeded with 200 g. of crystalline glucose and slowly agitated while its temperature was gradually lowered from 40° C. to about 30° C. over a period of 48 hours. This crystallization technique limited the glucose supersaturation to a maximum value of about 1.17. This caused about 65% of the syrup dry substance to separate as crystalline glucose. The crystalline product was collected in a perforated basket centrifuge and washed with a little cold water. Net yield of washed and dried first crop, 1750 g. The combined filtrate and washings were vacuum evaporated to about 78% dry substance and crystallized with seeding as before. The glucose supersaturation did not exceed 1.20. Net second crop after washing and drying amounted to 570 g., for a total of 2320 g. and 95% of theory based on the added starch. Color, flavor, and ash content of the glucose met commercial standards. Combined filtrate and washings from the second crystallization, to be returned to the amyloglucosidase conversion step of the next cycle, contained 1135 g. of dry substance.

The following table lists the important data obtained in a typical series of cycles according to the foregoing examples.

| Cycle No. | Dry Substance in | | Dry Substance Out | | Yield as Percent Theory Based on Starch |
|---|---|---|---|---|---|
| | Starch, g. | Mother Liquor, g. | Crystalline Glucose, g. | Mother Liquor, g. | |
| 1 | 2,435 | 1,000 | 2,820 | 1,136 | 95 |
| 2 | 1,950 | 1,136 | 2,210 | 1,150 | 93 |
| 3 | 1,950 | 1,150 | 2,140 | 1,250 | 90 |
| 4 | 2,000 | 1,250 | 2,470 | 1,132 | 101 |
| 5 | 2,000 | 1,132 | 2,300 | 1,154 | 94 |
| Total | 10,335 | | 11,940 | | [1] 95 |

[1] Average.

In Example 6, the order of the decolorizing and demineralizing steps may be reversed, the demineralizing step may be applied to the mother liquor from the crystallizing step before it is recycled with fresh starch hydrolyzate, or an alpha amylase thinned low D.E. sirup may be substituted for the low D.E. acid converted starch sirup.

To obtain commercially useful rates and extents of glucose crystallization, particularly in the cyclic process, as illustrated in Example 6, it is necessary to send syrup to the first crystallization step with a minimum D.E. of about 88. The percent glucose or D., as determined by the Zerban and Sattler method, corresponding to this D.E. is about 83. To meet this condition, it will be necessary to use an efficient amyloglucosidase enzyme preparation with a low content of soluble impurities, and to control the accumulation of salt and non-carbohydrate organic impurities in the mother liquor as described.

When ion exchange resins are used to prevent excessive accumulation of salt in the cyclic process liquors, a weak base anion exchanger or acid adsorber is preferred to a strong base type. The latter have the objectionable property of splitting neutral salts and yielding effluents of such high pH as to be harmful to the glucose by autooxidation.

*Example 7*

Example 1 is repeated except for replacing the concentrated culture broth of *Aspergillus phoenicis* (ATCC 13,157) with a concentrated broth from the submerged culturing of *Aspergillus niger*, NRRL 337 according to United States Patent 2,557,078, the latter broth containing 140,000 units of amyloglucosidase. Substantially the same yield of high quality crystalline glucose is obtained as in Example 1.

*Example 8*

Example 5 is repeated except for replacing the particular amyloglucosidase preparation (concentrated broth from the submerged culturing of *Aspergillus phoenicis* (ATCC 13,157) with a concentrated broth from the submerged culturing of *Aspergillus oryzae*, NRRL 696 according to United States Patent 2,557,078, the latter broth containing 140,000 units of amyloglucosidase. Substantially the same yield of high quality crystalline glucose is obtained as in Example 5.

We claim:
1. The method of producing crystalline glucose which comprises preparing a low D.E. starch conversion liquor by the interaction of starch and water in the presence of a starch conversion catalyst selected from the group consisting of alpha amylase and strong mineral acids, further hydrolyzing said low D.E. starch conversion liquor with amyloglucosidase until the D. of the liquor is not less than 83, concentrating said further hydrolyzed liquor to a percent dry substance which varies inversely with the D. of the liquor according to the table

| D | Percent dry substance by weight |
|---|---|
| 82.0–85.9 | 60–87.2 |
| 86.0–89.9 | 59–86.2 |
| 90.0–92.9 | 58–85.2 |
| 93.0–94.9 | 57–84.2 |
| 95.0–95.9 | 56–83.2 | adjusting the temperature of the concentrated liquor to a selected beginning crystallization temperature in the range of 20–54° C., seeding the liquor with crystals of glucose, controlling the glucose supersaturation of the seeded liquor to values lying within the range of 1.02 to 1.20 by appropriate regulation of liquor temperature, whereby crystalline glucose is formed, and separating mother liquor from crystalline glucose formed by said crystallization.

2. The method of producing crystalline glucose according to claim 1 wherein the D.E. of the low D.E. starch conversion liquor lies within the range of 10–20.

3. The cyclic process of producing crystalline glucose from starch which comprises pasting the starch with water, thinning the paste with the aid of a starch conversion catalyst selected from the group consisting of alpha amylase and strong mineral acids, mixing the thinned paste with glucose mother liquor, saccharifying the mixture with added amyloglucosidase until the percent glucose of the saccharified liquor dry substance is at least 83, contacting the liquor with a color adsorbent to remove color bodies and other soluble impurities, contacting the liquor with ion exchange resins, whereby the ash content of the liquor is controlled to a value not exceeding 3% by weight of the total solids and substantially all of the enzyme content of the liquor is removed, concentrating the liquor to a solids content which varies inversely with the D. of the liquor according to the table

| D | Percent dry substance by weight |
|---|---|
| 82.0–85.9 | 60–87.2 |
| 86.0–89.9 | 59–86.2 |
| 90.0–92.9 | 58–85.2 |
| 93.0–94.9 | 57–84.2 |
| 95.0–95.9 | 56–83.2 | adjusting the temperature of the concentrated liquor to a selected beginning temperature in the range of 20–54° C., seeding the liquor with crystals of glucose, controlling the glucose supersaturation of the seeded liquor to the range of 1.02 to 1.20 until the amount of crystalline glucose formed is equivalent to said starch, separating said crystalline glucose from mother liquor, and returning the mother liquor to the enzyme saccharification step.

4. The cyclic process of producing crystalline glucose from starch which comprises pasting the starch with water, thinning the paste with the aid of a starch conversion catalyst selected from the group consisting of alpha amylase and strong mineral acids, mixing the thinned paste with demineralized glucose mother liquor, saccharifying the mixture with added amyloglucosidase until the percent glucose of the saccharified liquor dry substance is at least 83, contacting the saccharified liquor with a color adsorbent to remove color bodies and other soluble impurities, concentrating the decolorized liquor to a solids content which varies inversely with the D. of the liquor according to the table

| D | Percent dry substance by weight |
|---|---|
| 82.0–85.9 | 60–87.2 |
| 86.0–89.9 | 59–86.2 |
| 90.0–92.9 | 58–85.2 |
| 93.0–94.9 | 57–84.2 |
| 95.0–95.9 | 56–83.2 | adjusting the temperature of the concentrated liquor to a selected beginning crystallization temperature in the range of 20–54° C., seeding the liquor with crystals of glucose, controlling the glucose supersaturation of the seeded liquor to the range of 1.02 to 1.20 until the amount of crystalline glucose formed is equivalent to said starch, separating said crystalline glucose from mother liquor, contacting the mother liquor with ion exchange resins, whereby the ash content of the feed syrup to the glucose crystallizing step is maintained at a value not exceeding 3% by weight of the total solids and substantially all of the enzyme content of the liquor is removed, and returning demineralized mother liquor to the enzyme conversion step.

5. The cyclic process of producing crystalline glucose according to claim 3, wherein the D.E. of the thinned starch paste lies within the range of 10–20.

6. The cyclic process of producing crystalline glucose according to claim 4, wherein the D.E. of the thinned starch paste lies within the range of 10–20.

7. The cyclic process according to claim 5 wherein the added amyloglucosidase is obtained from a mold selected from the group consisting of *Aspergillus phoenicis* ATCC 13,156 and *Aspergillus phoenicis* ATCC 13,157.

8. The cyclic process according to claim 6 wherein the added amyloglucosidase is obtained from a mold selected from the group consisting of *Aspergillus phoenicis* ATCC 13,156 and *Aspergillus phoenicis* ATCC 13,157.

References Cited in the file of this patent

UNITED STATES PATENTS

| | | |
|---|---|---|
| 2,557,078 | Corman | June 19, 1951 |
| 2,567,000 | Wallerstein et al. | Sept. 4, 1951 |
| 2,822,303 | Campbell et al. | Feb. 4, 1958 |
| 2,881,115 | Liggett et al. | Apr. 7, 1959 |
| 2,891,869 | Langlois | June 23, 1959 |
| 2,893,921 | Langlois et al. | July 7, 1959 |

UNITED STATES PATENT OFFICE

CERTIFICATE OF CORRECTION

Patent No. 3,039,935 June 19, 1962

Delmar F. Rentshler et al.

It is hereby certified that error appears in the above numbered patent requiring correction and that the said Letters Patent should read as corrected below.

Column 2, line 13, for "and" read -- acid --.

Signed and sealed this 29th day of January 1963.

(SEAL)
Attest:

ERNEST W. SWIDER
Attesting Officer

DAVID L. LADD
Commissioner of Patents